(12) United States Patent
Park

(10) Patent No.: US 9,772,628 B2
(45) Date of Patent: Sep. 26, 2017

(54) FLUID DISCHARGE DEVICE

(76) Inventor: Euntae Park, Yongin-si (KR)

( * ) Notice: Subject to any disclaimer, the term of this patent is extended or adjusted under 35 U.S.C. 154(b) by 1227 days.

(21) Appl. No.: 13/825,057

(22) PCT Filed: Sep. 8, 2011

(86) PCT No.: PCT/KR2011/006640
§ 371 (c)(1),
(2), (4) Date: Mar. 19, 2013

(87) PCT Pub. No.: WO2012/036411
PCT Pub. Date: Mar. 22, 2012

(65) Prior Publication Data
US 2013/0200166 A1    Aug. 8, 2013

(30) Foreign Application Priority Data

Sep. 19, 2010    (KR) .................. 10-2010-0092197

(51) Int. Cl.
| | | |
|---|---|---|
| G05D 7/01 | (2006.01) | |
| G05D 7/03 | (2006.01) | |
| E03C 1/08 | (2006.01) | |
| F16K 31/18 | (2006.01) | |
| G05D 23/13 | (2006.01) | |
| E03C 1/02 | (2006.01) | |

(52) U.S. Cl.
CPC ............... G05D 7/03 (2013.01); E03C 1/08 (2013.01); F16K 31/18 (2013.01); G05D 7/0146 (2013.01); G05D 7/0166 (2013.01); G05D 23/1313 (2013.01); *E03C 2001/026* (2013.01); *Y10T 137/7358* (2015.04); *Y10T 137/7762* (2015.04)

(58) Field of Classification Search
CPC .... G05D 7/03; G05D 7/0146; G05D 23/1313; G05D 7/0166; F16K 31/18; F16K 15/00; F16K 15/023; E03C 1/08; E03C 2001/026; Y10T 137/7358; Y10T 137/7762
USPC ....... 251/318; 137/101.25–101.27, 497, 504, 137/533
See application file for complete search history.

(56) References Cited

U.S. PATENT DOCUMENTS 4,279,267 A  *  7/1981  Bron .................. A01M 7/0089
                                                    137/100
5,097,863 A  *  3/1992  McCann .............. G05D 7/0126
                                                    137/504

FOREIGN PATENT DOCUMENTS

| JP | 07-026609 | 1/1995 |
|---|---|---|
| JP | 2001-262646 | 9/2001 |
| KR | 20-0280252 | 7/2002 |
| KR | 10-2006-0063841 | 6/2006 |
| KR | 20-2009-0008310 | 8/2009 |

OTHER PUBLICATIONS

International Search Report for PCT/KR2011/006640 dated Apr. 26, 2012.

* cited by examiner

*Primary Examiner* — Marina Tietjen

(57) ABSTRACT

The present invention relates to the fluid discharge device of a fluid transfer pipe, and to a technology which alters the sectional area of a discharge hole in proportion to the increase or decrease in fluid discharge flow per unit of time so as to maintain a relatively uniform fluid discharge rate from the discharge hole.

1 Claim, 19 Drawing Sheets

[Fig. 1]
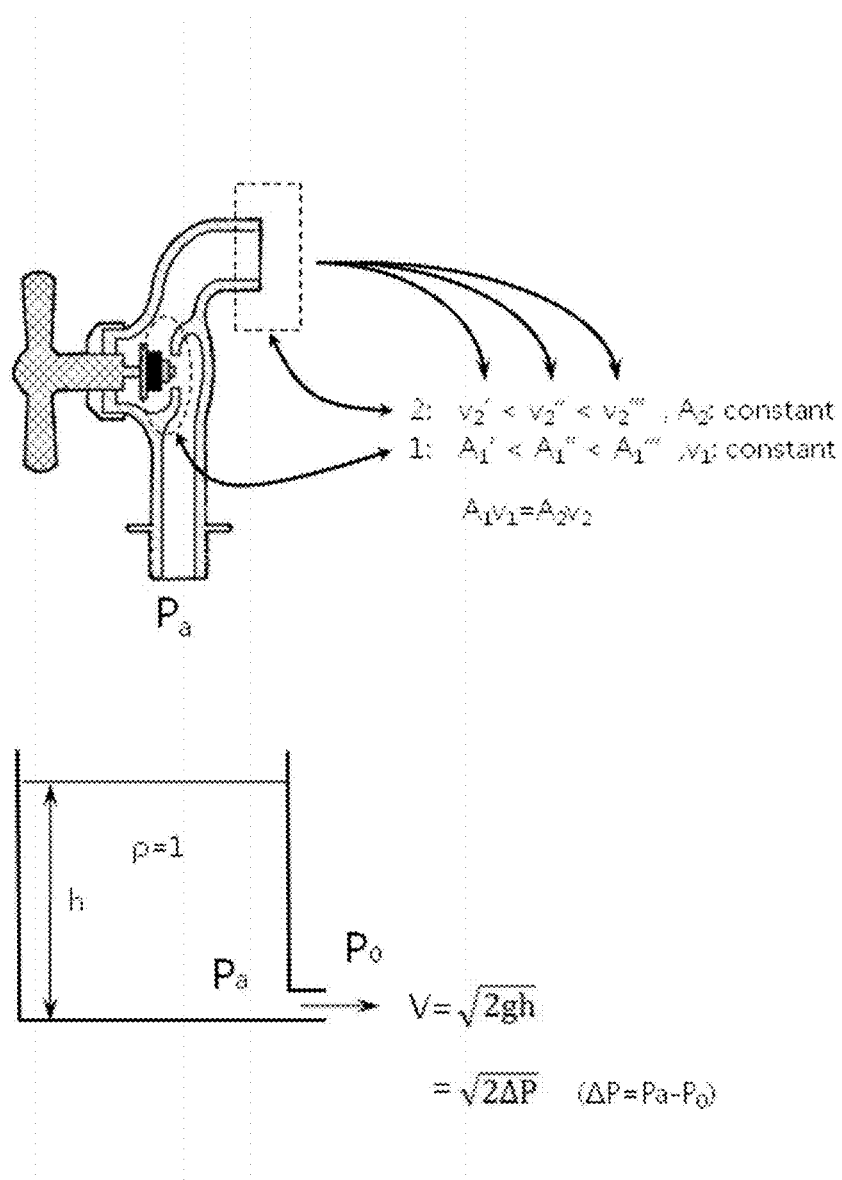

[Fig. 2]
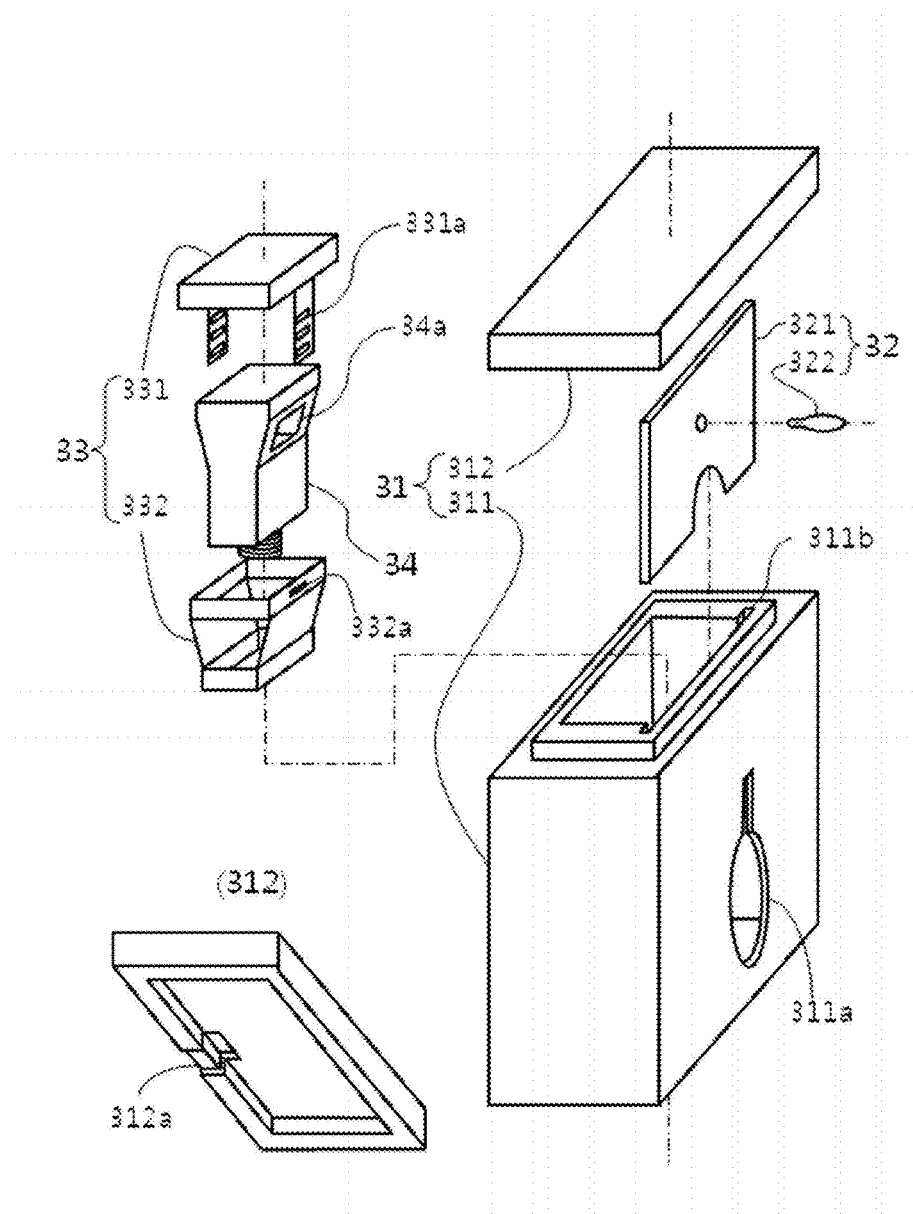

[Fig. 3]
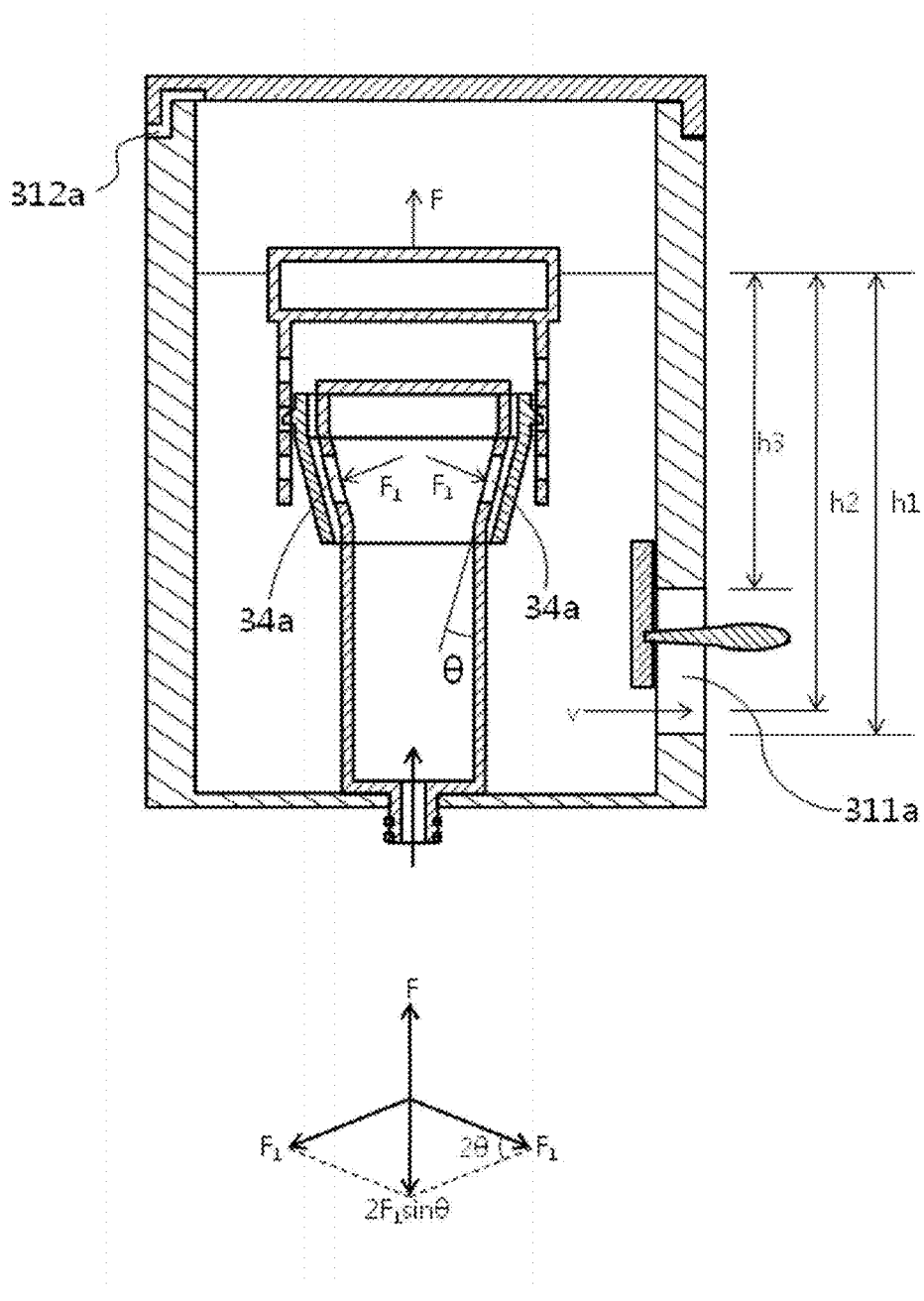

[Fig. 3a]
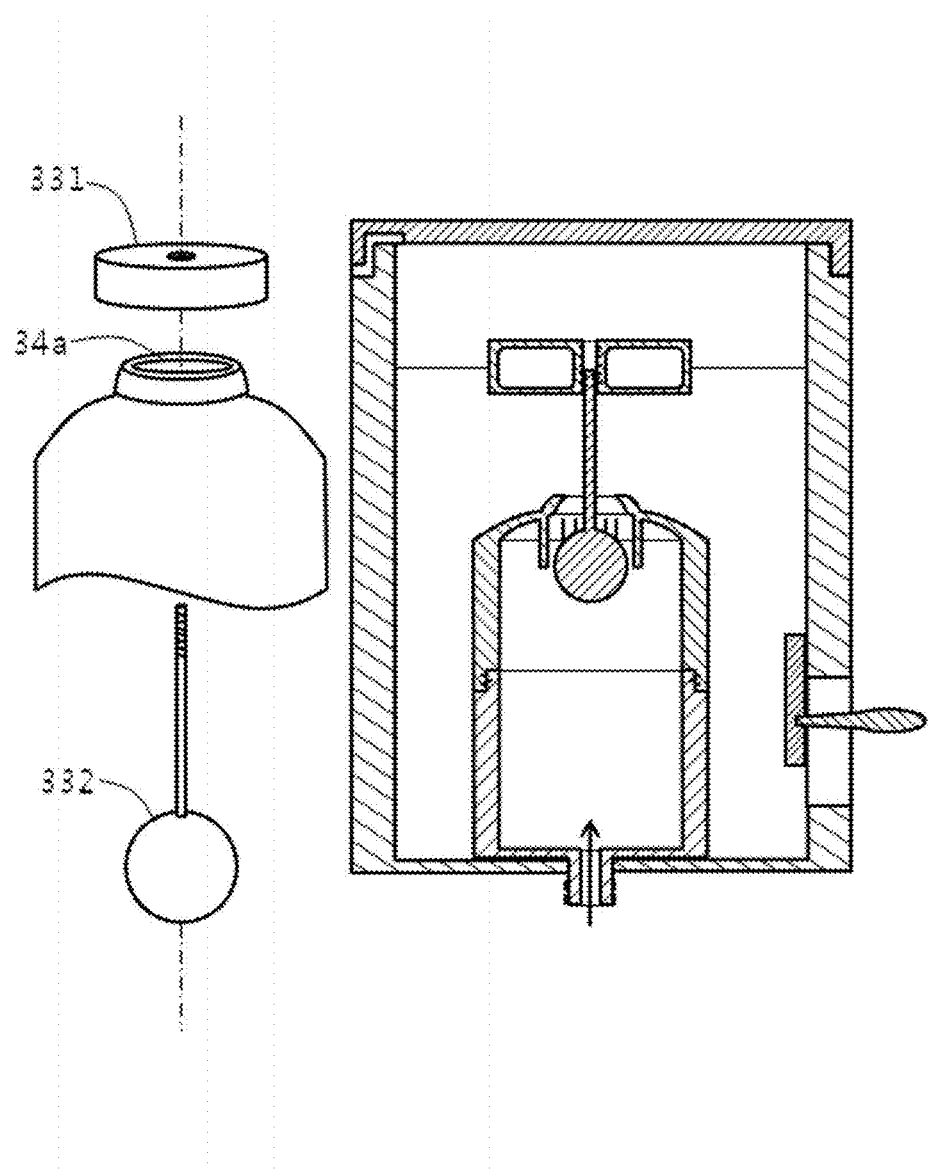

[Fig. 4]
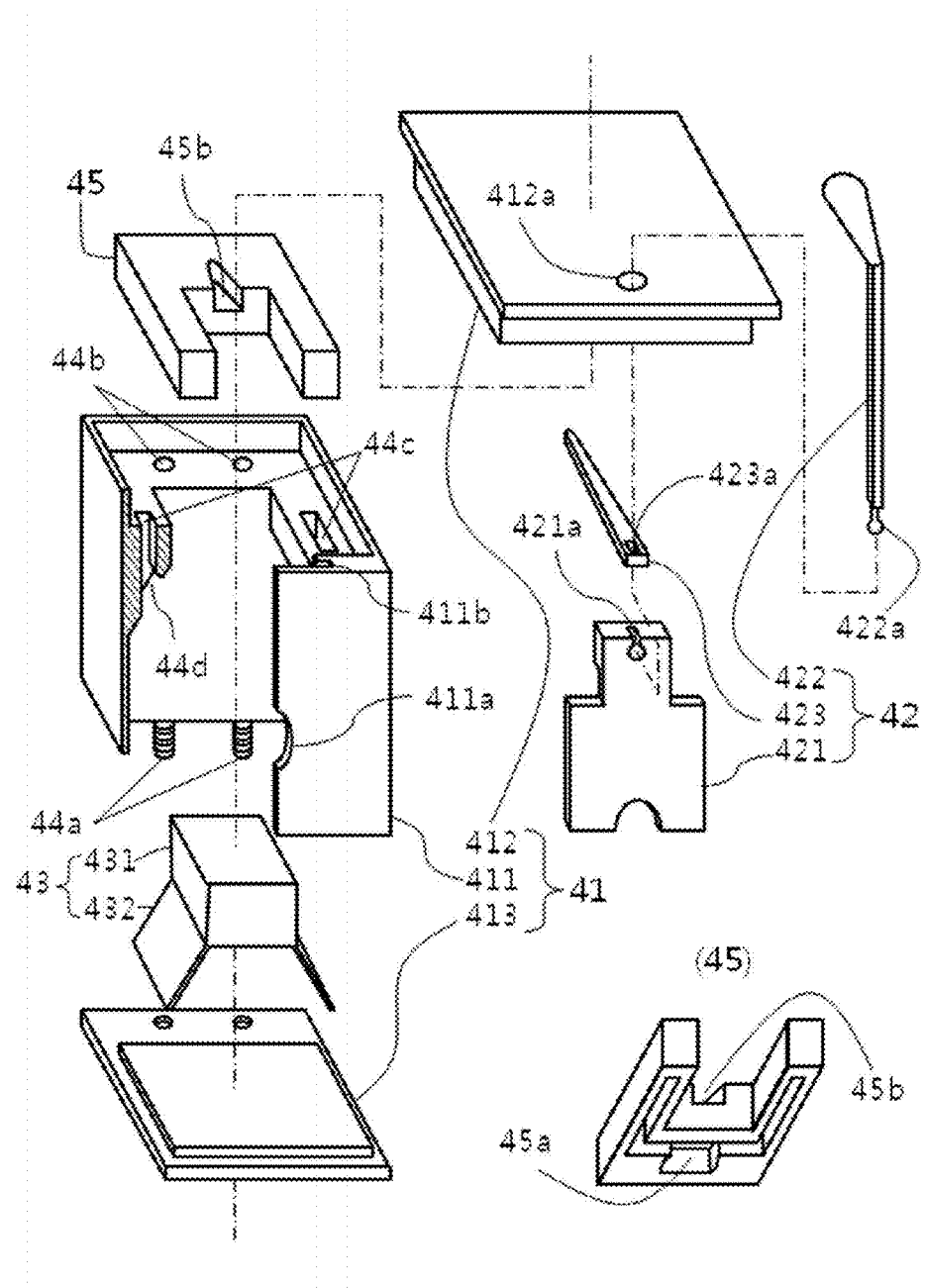

[Fig. 5]
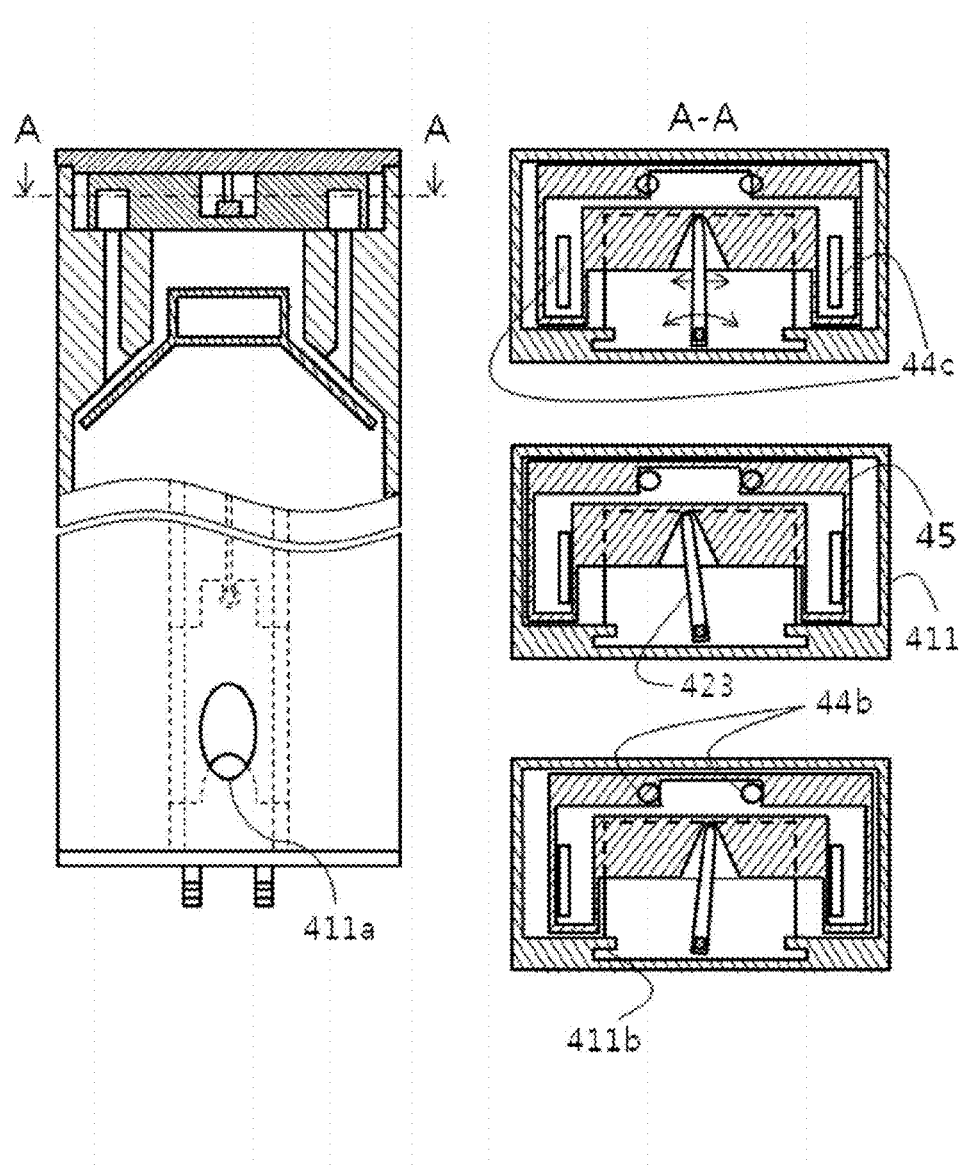

[Fig. 6]
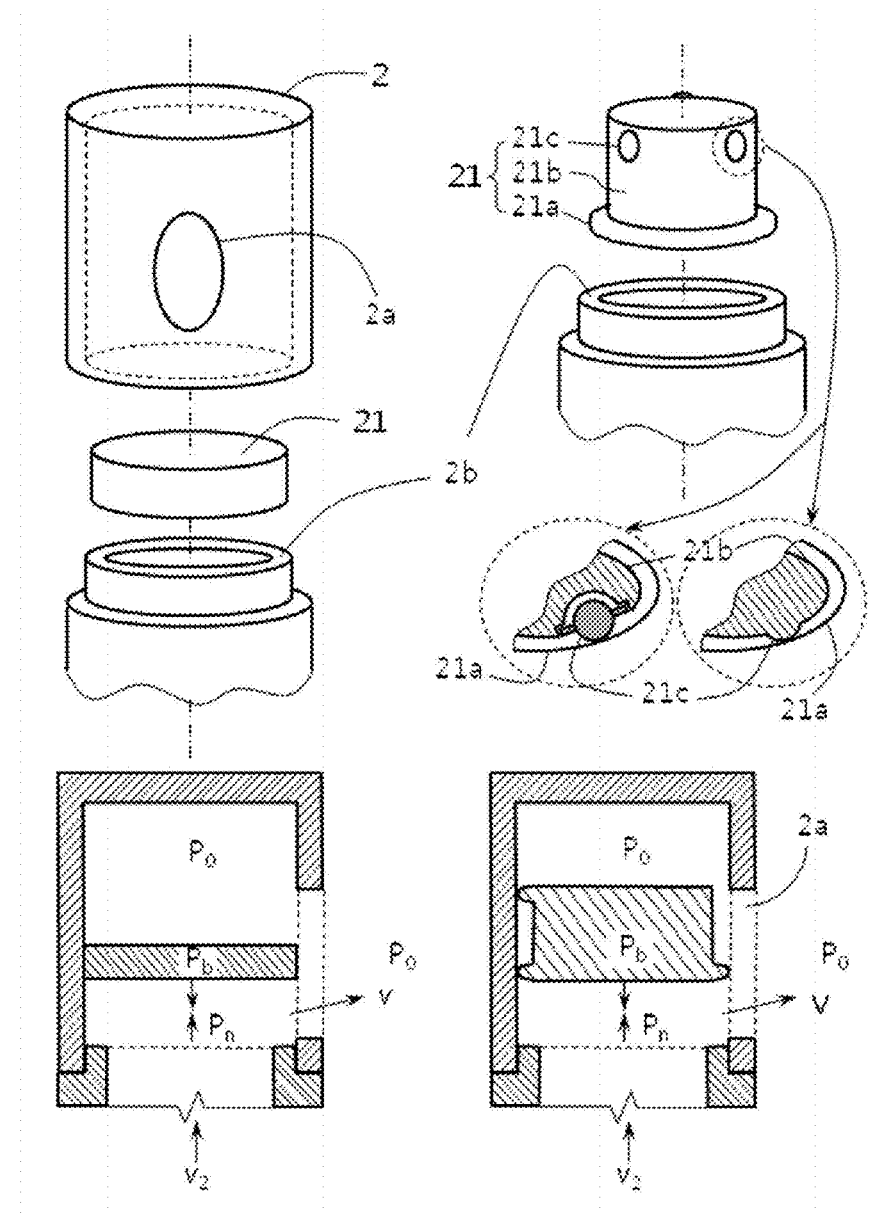

[Fig. 7]
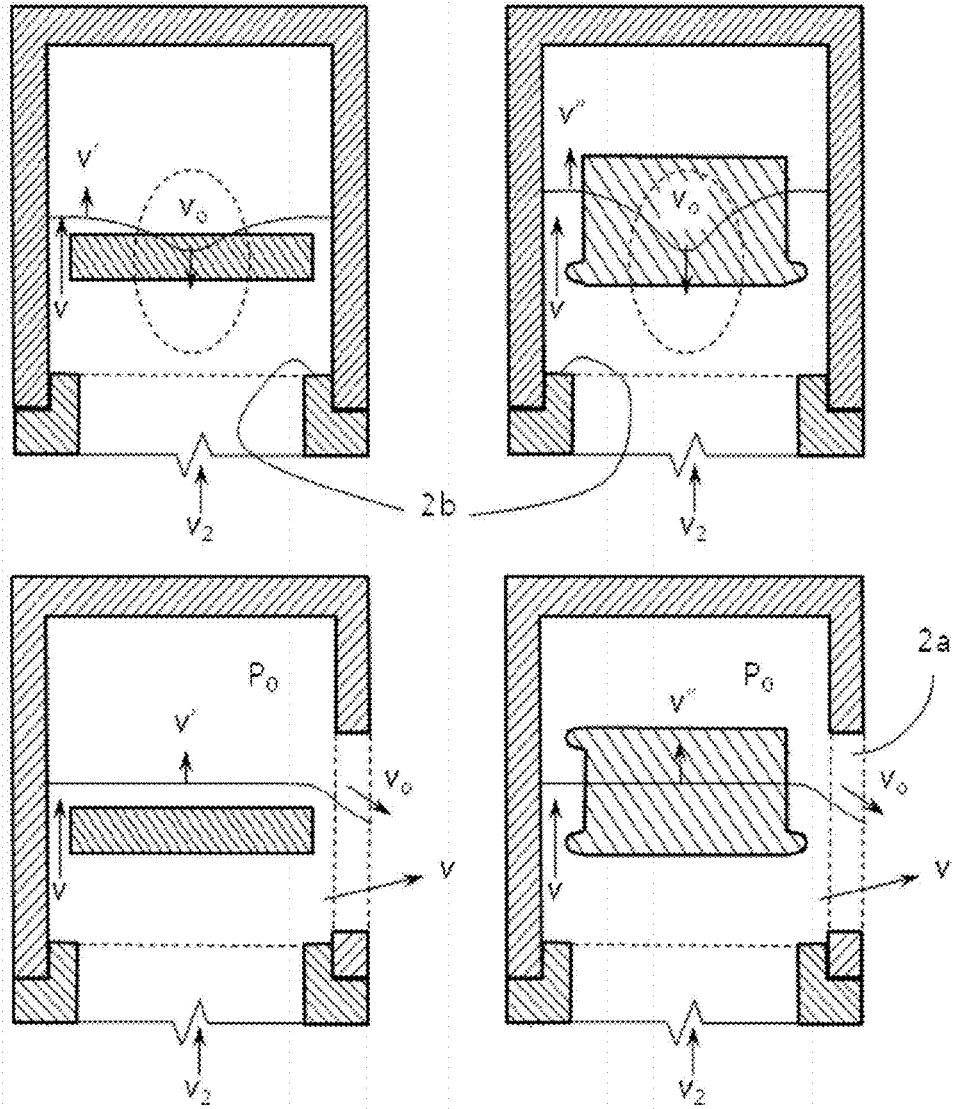

[Fig. 8]
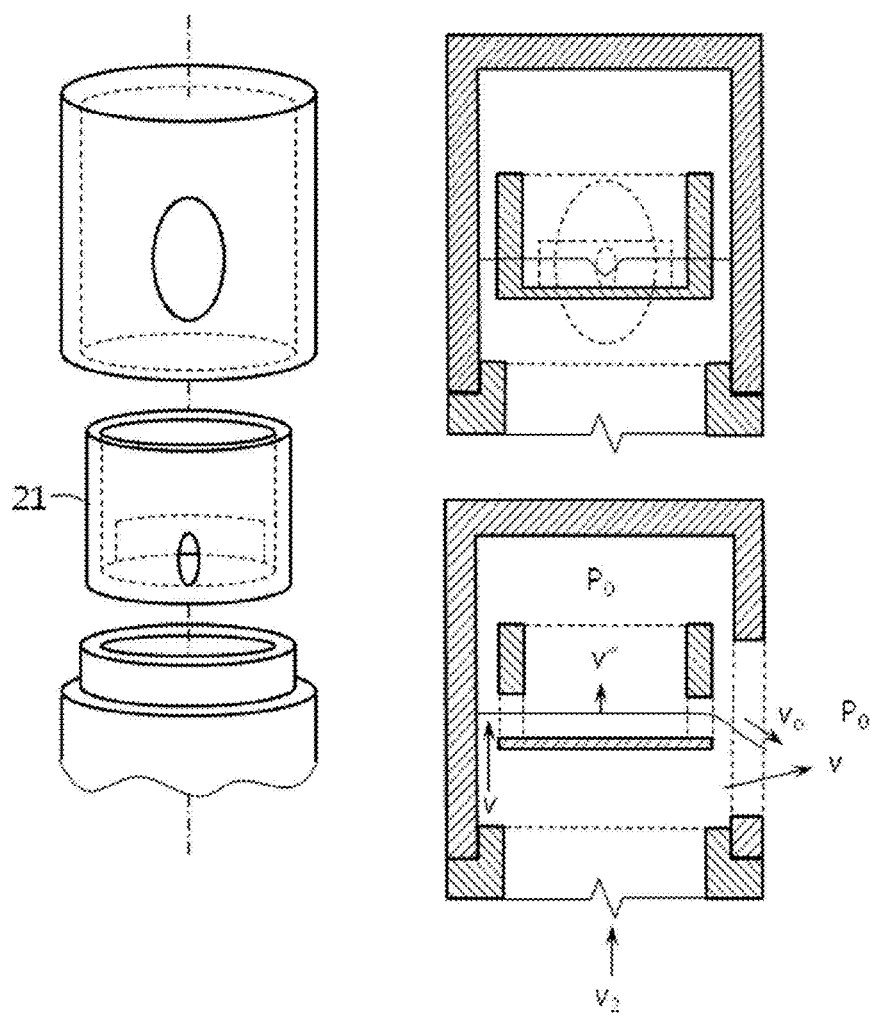

[Fig. 9]
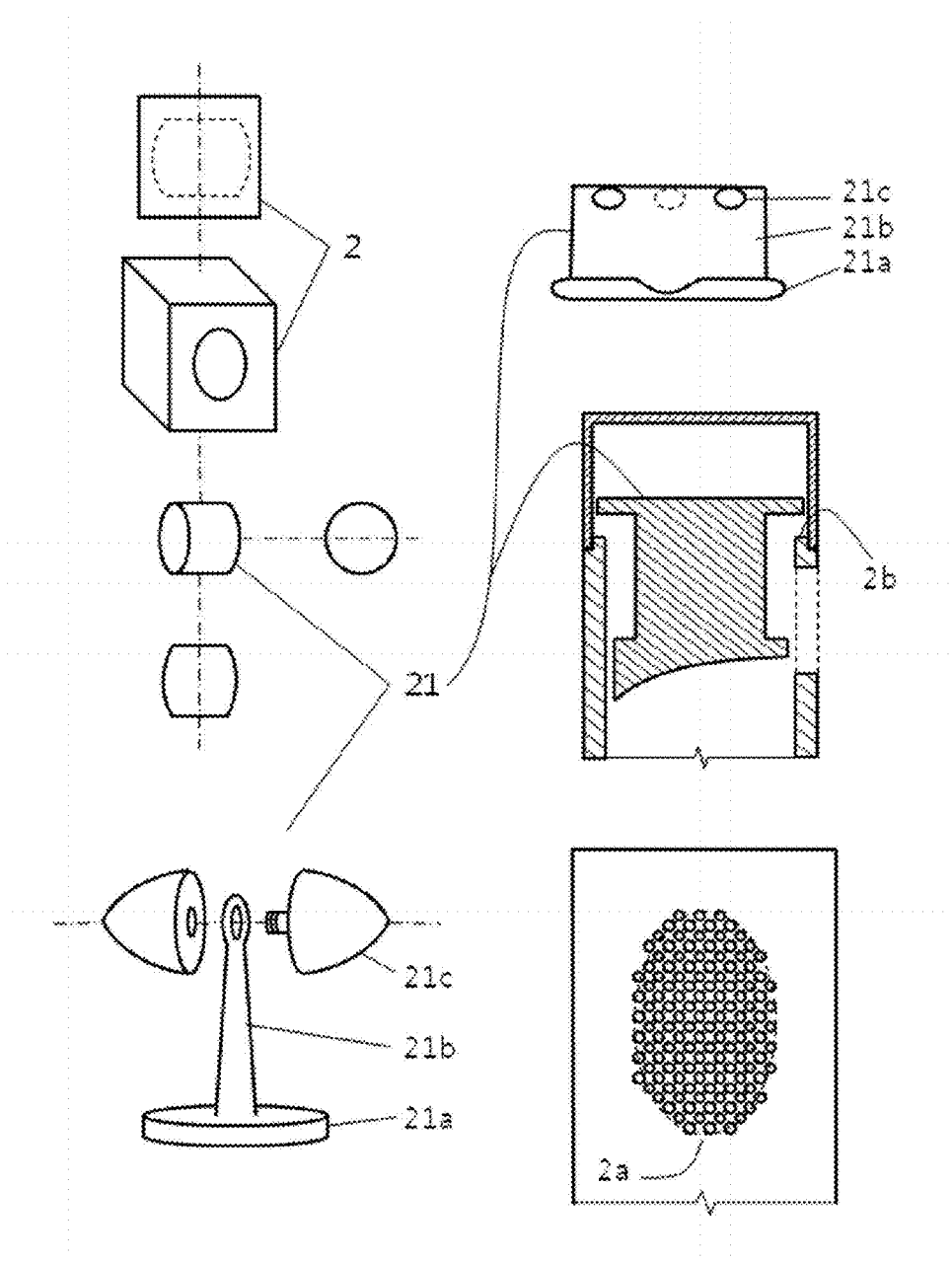

[Fig. 10]
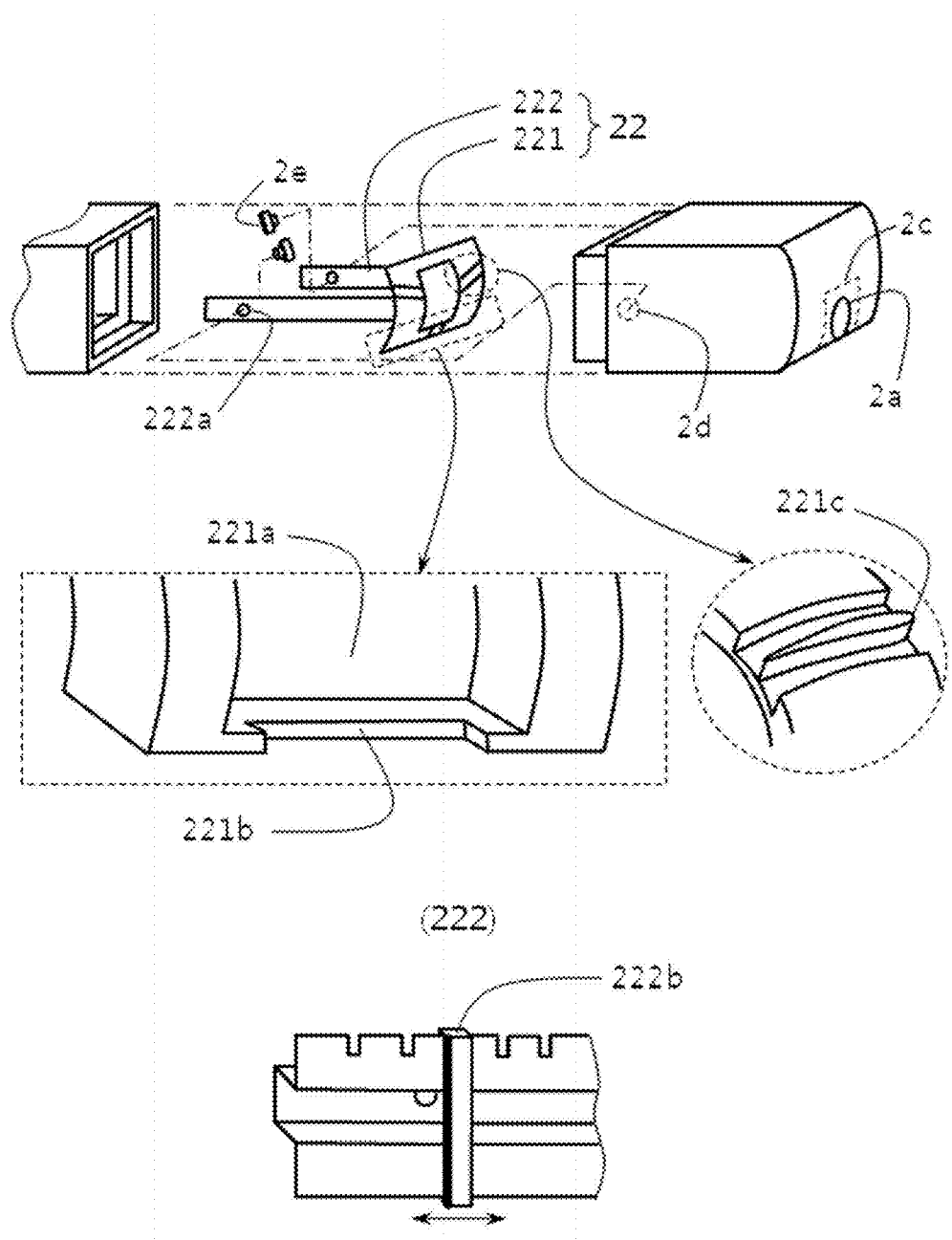

[Fig. 11]
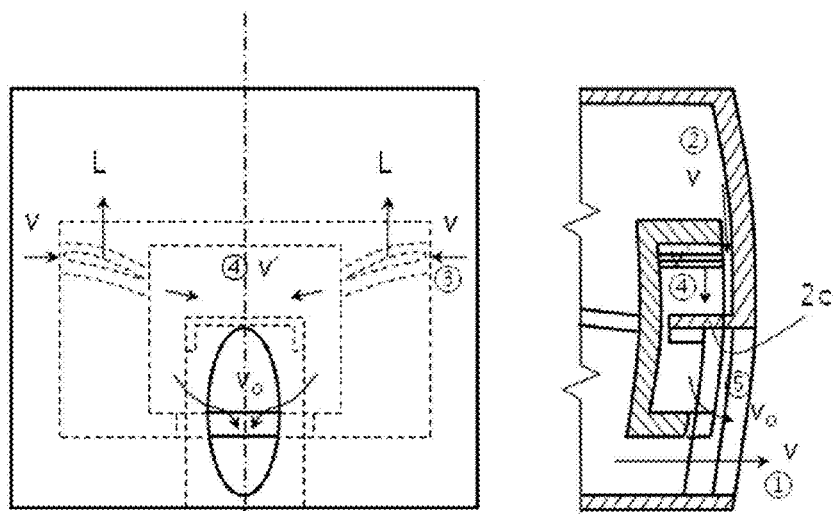
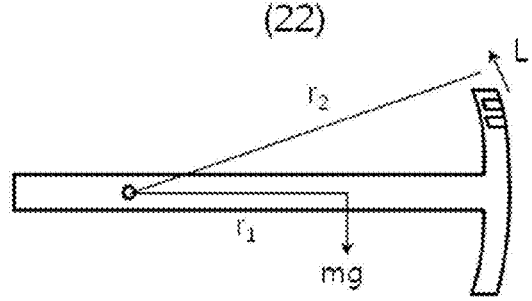

[Fig. 12]
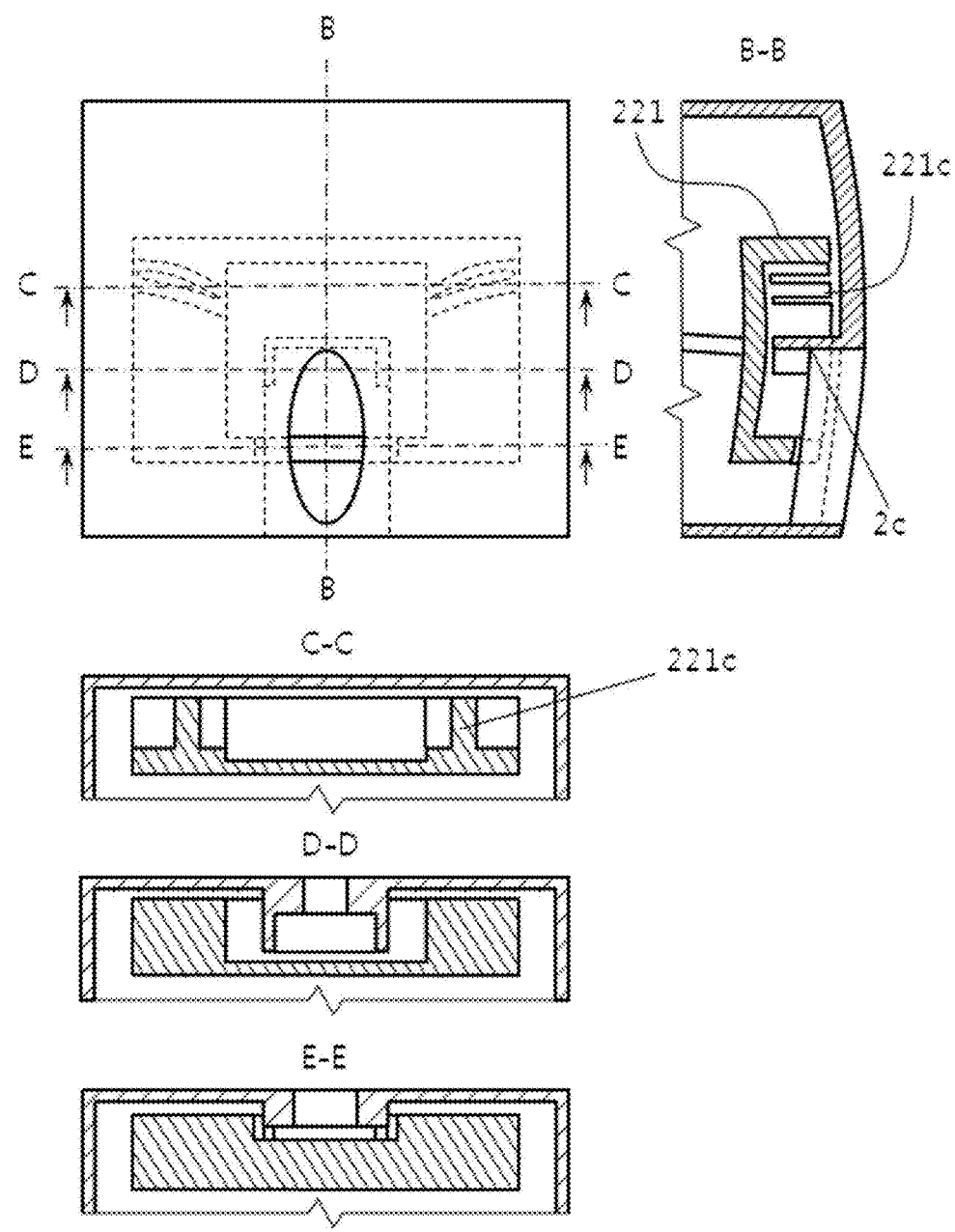

[Fig. 13]
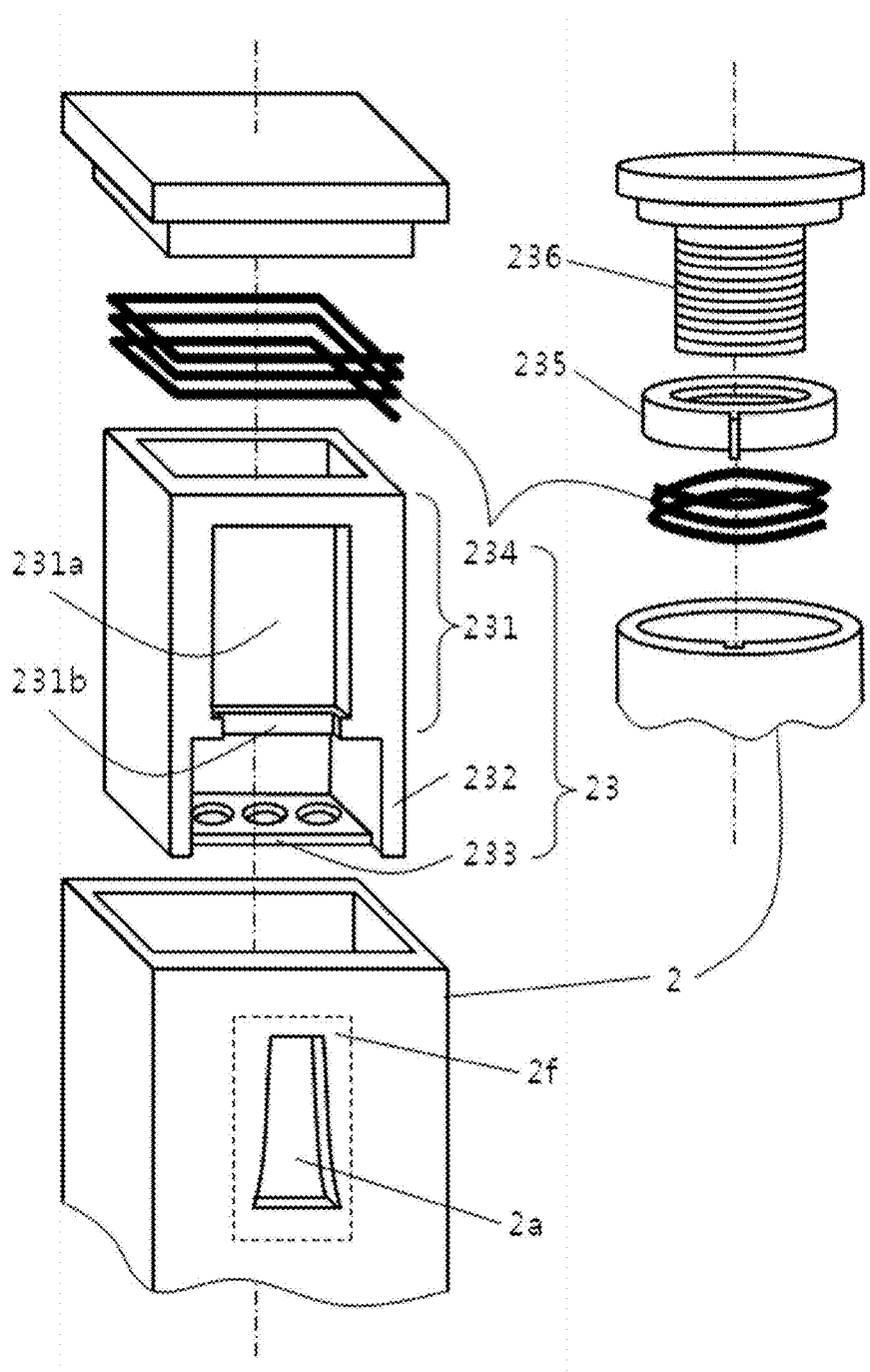

[Fig. 14]
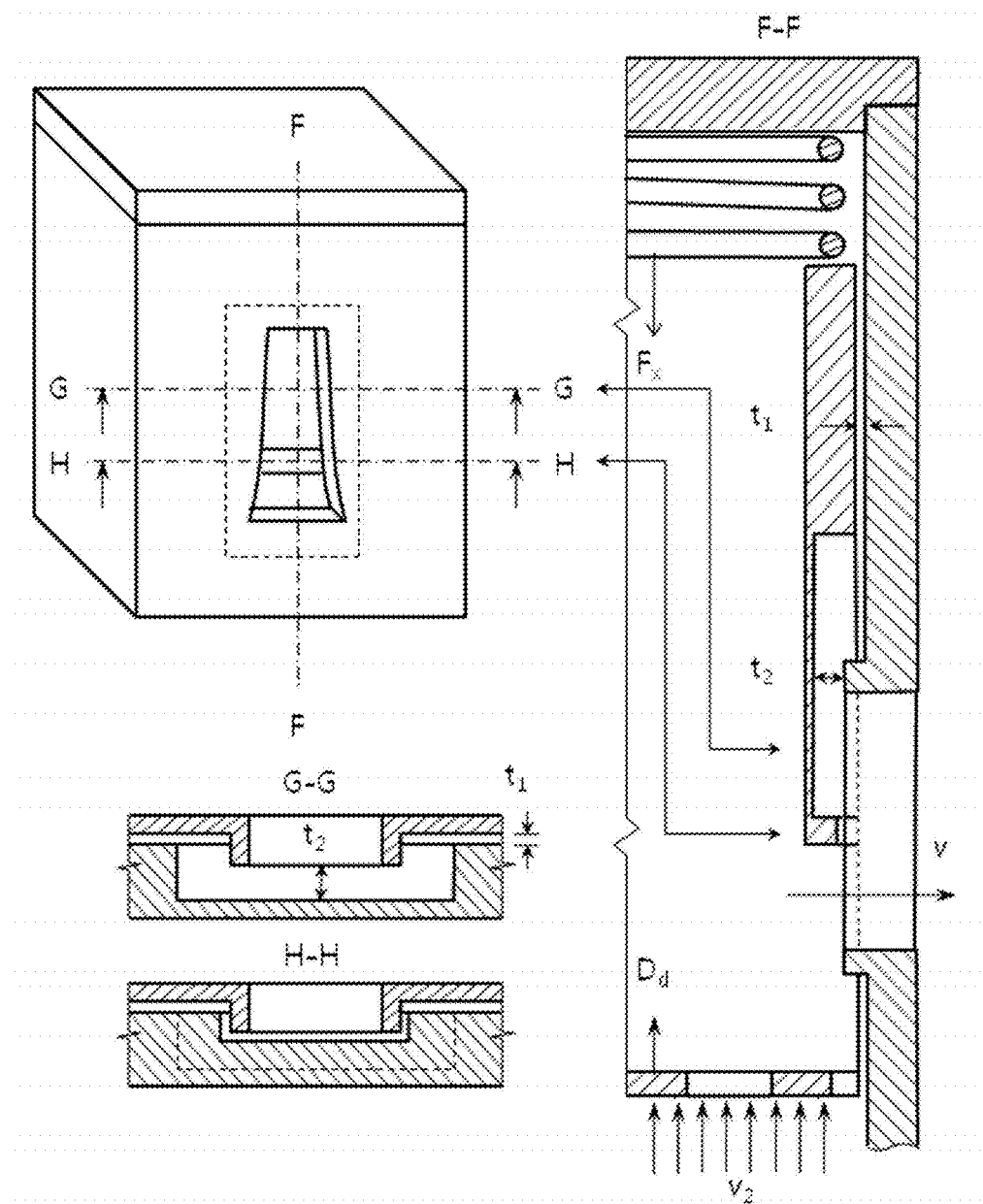

[Fig. 15]
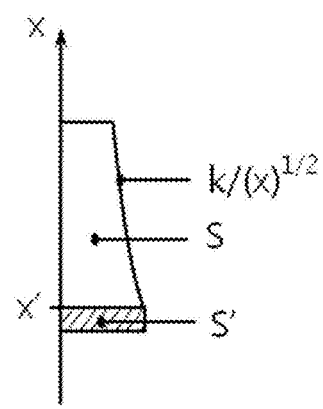

[Fig. 16]
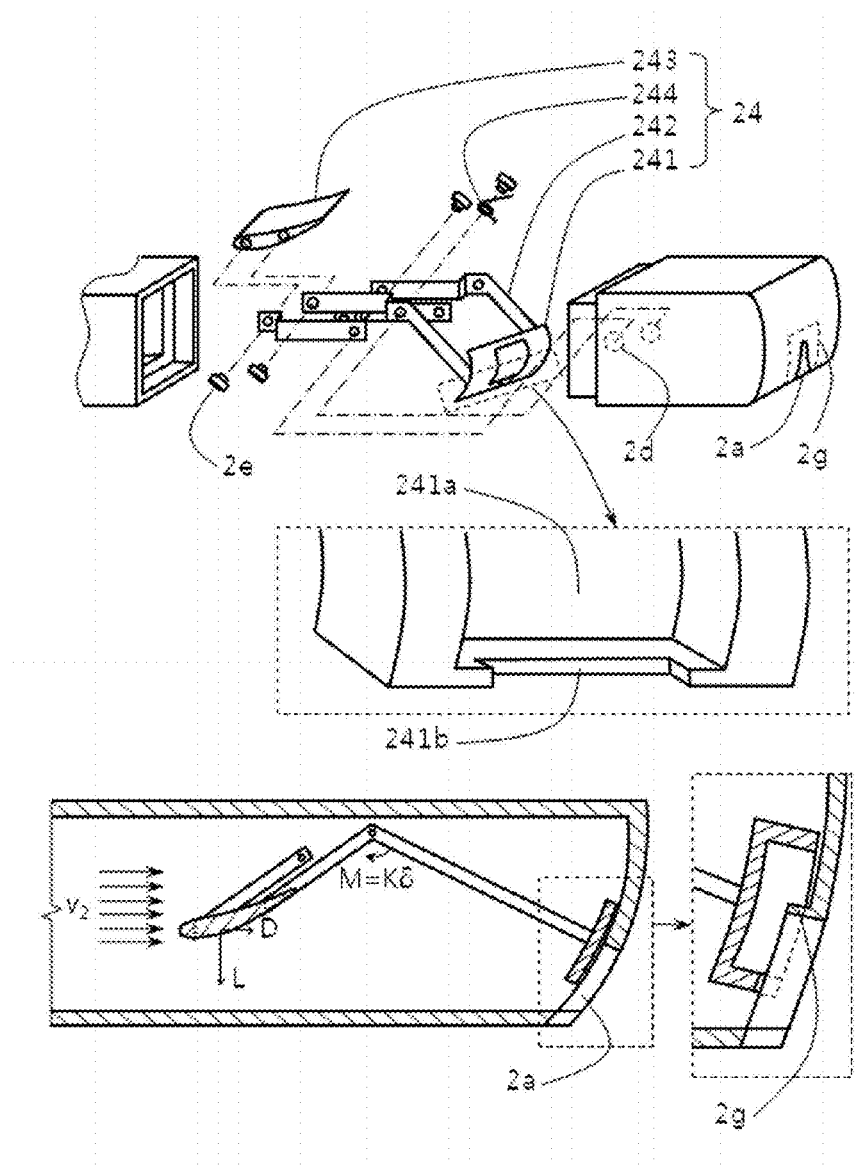

[Fig. 17]
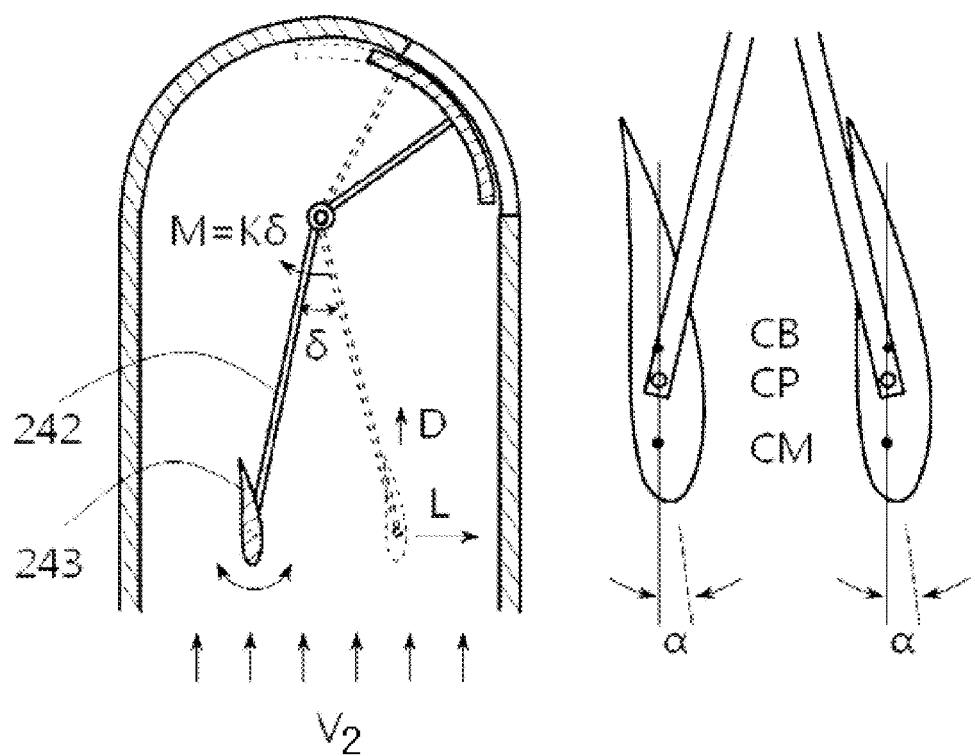

[Fig. 18]
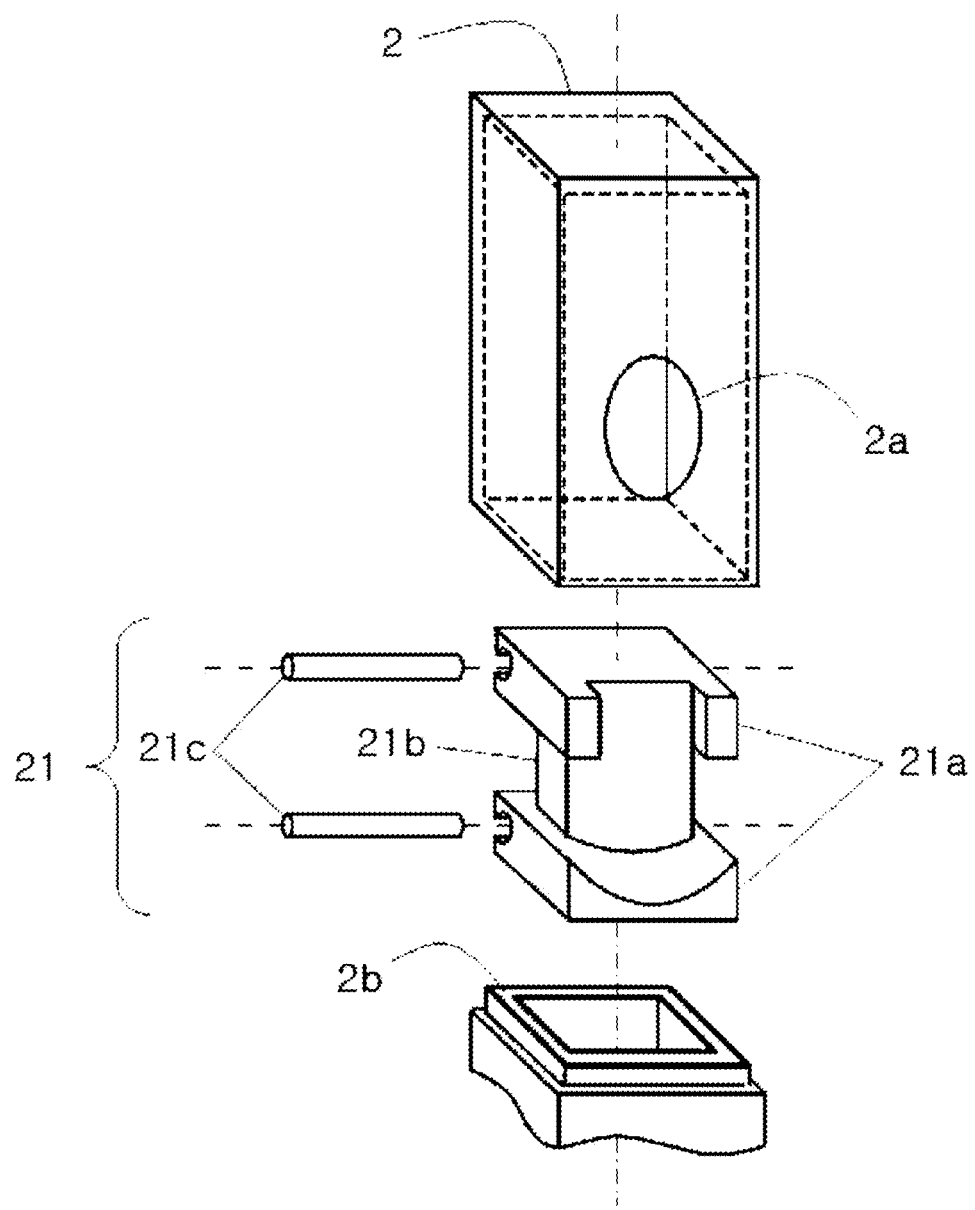

FLUID DISCHARGE DEVICE

RELATED APPLICATIONS

This application is a 371 application of International Application No. PCT/KR2011/006640, filed Sep. 8, 2011 which in turn claims priority from Korean Patent Application No. 10-2010-0092197, filed Sep. 19, 2010, each of which is incorporated herein by reference in its entirety.

CROSS-REFERENCE TO RELATED APPLICATION

This application claims the benefit of Korean Patent Application No. 10-2010-0092197, filed on Sep. 19, 2010 in the Korean Intellectual Property Office, the disclosure of which is incorporated herein by reference.

TECHNICAL FIELD

The present invention relates to technology of a final discharge device of a fluid supply pipe such as a faucet.

BACKGROUND ART

A law of continuity of a fluid, Torricelli's law, Bernoulli's equation, a law of a drag and a lift, and a float valve are used. Hereinafter, an exemplary embodiment of using a faucet will be described.

DISCLOSURE

Technical Problem

In a conventional faucet, because a discharge speed of water in a discharge port changes according to an opening rate of a flux adjustment valve, the discharge port should be disposed downward. Therefore, when drinking water or rinsing a mouth, an instrument such as a cup is necessary, and the faucet invades somewhat a central portion of a washstand or a bathtub and thus it is inconvenient to use the faucet and a risk of an injury somewhat exists. The present invention solves such a problem by uniformly maintaining a discharge speed at a fluid discharge port regardless of an opening rate of a valve.

Technical Solution i) Law of Continuity

In a case where a conventional faucet is installed, as shown in FIG. 1, a trajectory of water discharged to a discharge port is described. A flow velocity $v_1$ in a flux adjustment valve 1 (hereinafter, a valve T) is constant because an upper stream side (injection portion) water pressure $p_a$ of the value T is constant and a sectional area $A_2$ of a discharge part is fixed. According to an equation of continuity [Equations 1 and 2], a flow velocity $v_2$ at the discharge port changes proportional to an opening rate $A_1$ of the valve T (FIG. 1, $v_2'$, $v_2''$, . . . )

$$A_1 v_1 = A_2 v_2 \quad (1)$$

$$v_2 = kA_1 \ (k = v_1/A_2, \text{ constant}) \quad (2)$$

ii) Torricelli's Law and Bernoulli's Theorem

A discharge speed of a liquid (FIG. 1) ejected from a large water tank exposed at the atmosphere is represented with Equation 3 (Torricelli's law). This is an application example of Bernoulli's equation and is equally represented when applying.

$$v = \sqrt{2gh} \quad (3)$$

$$\rho g h = (1/2) \rho v^2$$

$$v = \sqrt{2 \rho g h / \rho} = \sqrt{2gh}$$

$$= \sqrt{2\Delta P/\rho} = \sqrt{2\Delta P}, \ (\rho=1, \Delta P = P_a - P_0 = \rho g h) \quad (4)$$

In a water supply device of a house or an apartment that receives water from a water tank installed at the roof, a flow velocity (FIG. 1, $v_1$) in the valve T is determined by the law.

iii) Application of Principle

The subject is solved using Torricelli's law directly by installing a discharge port valve in a water tank that maintains a predetermined water level by a float valve and a method of changing a sectional area of a discharge port using a lift and a drag [i.e., change $A_2$ in proportion to $A_1$ in Equation 1].

Advantageous effects 1) convenience of use, 2) diversity of design, 3) Prevention of injury

BRIEF DESCRIPTION OF DRAWINGS

FIG. 1 illustrates an example in which a law of continuity and Torricelli's law are applied.

FIGS. 2 to 5 illustrate an example in which Torricelli's law is applied using a float valve according to an exemplary embodiment of the present invention.

FIGS. 6 to 9 illustrate an example in which gravity, a drag, and a law of continuity are applied according to an exemplary embodiment of the present invention.

FIGS. 10 to 12 illustrate an example using a lift and a torque according to an exemplary embodiment of the present invention.

FIGS. 13 to 15 illustrate an example using a drag and a restoring force of an elastic body according to an exemplary embodiment of the present invention.

FIGS. 16 and 17 illustrate an example using a lift and a restoring force of an elastic body according to an exemplary embodiment of the present invention.

FIG. 18 illustrates an example in which gravity, a drag, and a law of continuity are applied according to an exemplary embodiment of the present invention.

BEST MODES FOR CARRYING OUT THE INVENTION

A fluid discharge port is installed horizontally or horizontal upward toward a washstand or a bathtub to be used as a faucet. In this case, because a discharge flow velocity is constant regardless of an opening rate of a discharge flux adjustment valve, unlike a conventional faucet, the fluid discharge port can be used without inconvenience and has several conveniences.

MODE FOR CARRYING OUT THE INVENTION

Directly use Torricelli's law (FIGS. 2, 3, 3a, 4, and 5)

Discharge port valves A (32 and 42) (hereinafter, a valve A) in which handles 322 and 422 and plates 321 and 421 are coupled are mounted in seat 311b and 411b formed in water tanks 31 and 41, and then vertically move, for open and close discharge ports 311a and 411a. Water tank inlets 34a and 44d are formed in an end portion of a passage for supplying water (or mixed water) into the water tank, and the water tank inlet is opened and closed by float valves 33 and 43. In an upper portion of the water tank, holes 312a and 412a for maintaining water tank internal space to an atmospheric pressure exist, and when the outside thereof is formed to be low and the inside thereof is formed to be high (312a), a foreign substance can be suppressed from injecting.

A buoyant force F of a float valve, a sectional area of a water tank inlet, and a tilt angle θ are appropriately designed in consideration of a relationship with an upper stream water pressure of the float valve. In a case where the same water tank inlet is formed at inclined left and right symmetrical planes, a maximum value $F_{max}$ of F should be larger than $2F_1 \sin \theta$ in order for the float valve to perform a function. Therefore, a maximum allowable sectional area of the water tank inlet is related to a tilt angle, when other conditions are the same (FIG. 3). When an upper stream water pressure of the float valve is $P_a$ and a sectional area of one side of the water tank inlet is $A_3$, a relationship of $A_3$ and θ is represented with Equation 7. Therefore, when a tilt angle is 90°, a maximum allowable sectional area of the water tank inlet has a minimum value.

$$F_1 = A_3 P_a \quad (5)$$

$$F_{max} > 2F_1 \sin \theta = 2A_3 P_a \sin \theta \quad (6)$$

$$A_3 < \frac{F_{max}}{2P_a \sin \theta} \quad (7)$$

When closure members 332 and 432 of the float valve are positioned at the upper stream side of an inlet of the water tank, the valve may operate with a relatively lower buoyant force even in a high water pressure (FIG. 3a)

Because a water level within the water tank always maintains a constant height by the float valve, when the discharge port of the water tank is opened by raising handles 322 and 422 of the valve A, a discharge speed v of water is determined to a constant value by Equation 3, which is Torricelli's law. However, because water levels $h_1$ and $h_2$ are different at each point of the discharge port, v may be different, but when an average water level h is much larger than a vertical gap ($\Delta h_{max} = h_1 - h_3$) of the discharge port ($h >> \Delta h_{max}$), such a difference may be ignored. The water level may be adjusted according to a coupling position of a protruded portion 332a and a groove 331a of the float valve.

FIGS. 4 and 5 illustrate that a conventional cold and warm water mixing function is added to the foregoing principle. A water inlet 44a and a water outlet 44b are separately formed to divide cold water and warm water and add a mixing valve 45 that can adjust and mix a ratio of cold water and warm water and a lever 423 that can move the mixing valve. A handle 422 inserted into the hole 412a of an upper lid is again inserted into a polygonal, oval, or saw-toothed wheel-shaped hole 423a at one end of the lever, and a ball-shaped end portion 422a is finally mounted in a groove 421a of the same shape in an upper portion of a plate. The handle may vertically move, and in this case, the plate moves together, but the lever 423 and the upper lid 412 are coupled not to move. The handle can rotate clockwise or counterclockwise, and in this case, the hole 423a of the lever and an intermediate portion of the handle are engaged, and the lever can rotate together, but the upper lid and the plate are coupled not to rotate.

In a lower portion of the mixing valve, by complementarily opening and closing two water outlets 44b divided into cold water and warm water, a groove 45a that connects cold water, warm water, and mixed water thereof to a mixed water outlet 44c exists. As another one end of the lever is mounted in an upper groove 45b of the mixing valve, when the lever rotates, by laterally moving the mixing valve, the another one end performs a function of determining a mixing ratio of cold and warm water (FIG. 5, represented by line A-A of a cross-sectional view). The mixing valve may be added in a form of a three-direction mixing type (T port) plug valve in an intermediate portion of a water passage 34 of FIGS. 2 and 3.

Cold and warm water is supplied to a lower groove 45a of the mixing valve from a water inlet 44a connected to a water pipe to a water outlet 44b via a water passage and is appropriately mixed at here. The mixed water is supplied from the mixed water outlet 44c into a water tank through a water tank inlet 44d opened and closed by a float valve.

In FIG. 4, when a lower portion of the upper lid 412 is formed in the same shape as that of a lower portion of the mixing valve and when the mixing valve and the lever are removed, an exemplary embodiment of FIG. 2 is obtained.

It is unnecessary that the valve A is always a gate valve, as shown in the drawing, and when the valve A has a structure in which Torricelli's law may be applied to discharge ports 311a and 411a, the valve A may be a plug valve, a ball valve, and a pinch valve.

In a state in which a fluid within a water tank is a liquid and the outside thereof is a gas, the present invention is applied only to a fluid discharge port that discharges a liquid within the water tank to the outside.

2) Use Drag and Gravity (FIGS. 6, 7, 8, 9, 18)

Hereinafter, the present invention relates to a discharge port (portion 2 of FIG. 1) of a conventional faucet, and in the drawing, a valve T (portion 1 of FIG. 1) is not shown [hereinafter, the same in 3), 4), and 5)]. At the pipe 2 connected to the down stream side (discharge portion) of the valve T, a discharge port 2a and a valve seat 2b are formed, and at the inside of the pipe, a discharge port valve B (21) (hereinafter, a valve B) that moves along the pipe and that opens and closes the discharge port is installed. The discharge port maintains an appropriate gap from the end of the pipe in consideration of a size of the valve B. A seat 2b of the valve B is selectively formed at the upper stream side or the down stream side of the discharge port and sets an appropriate position in consideration of a shape of the valve B and its moving range. The seat of the B valve may be several protrusion shapes, unlike as shown in the drawing. The valve B may have the same sectional shape and area from the top to the bottom, and a sectional area of an intermediate portion 21b may be smaller than that of a lower portion 21a, an upper portion 21c may be the same as the lower portion, may be several protrusions, or may have a shape in which several balls or rollers are inserted in a round, and thus the valve B may changed in various forms. A pipe may be vertically disposed (i.e., the discharge port may be disposed toward a horizontal direction) or may maintain an appropriate angle from a horizontal plane (i.e., the discharge port may be disposed at an angle 45° upward from a horizontal plane). Hereinafter, an operation principle illustrates a case where the discharge port is vertically disposed. As the valve T (1) is opened, when water is discharged to the discharge port, if the sum $P_b + P_0$ of a pressure $P_b$ by the valve B and an atmospheric pressure $P_0$ of upper space of the valve B is the same as a water pressure $P_n$ of the discharge port ($P_n = P_b + P_0$), equilibrium of a pressure is obtained. In this case, in the discharge port, a pressure difference $\Delta P$ between the inside and outside of the pipe becomes $P_b$ [Equation 8], and as Equation 4, v has a constant value [Equation 9] ($P_b$ has a constant value as a weight, a volume, and a form of the valve B are determined).

$$P_n = P_b + P_0$$

$$\Delta P = P_n - P_0 = P_b \tag{8}$$

$$v\sqrt{2\Delta P/\rho} = \sqrt{2P_b}, (\rho=1) \tag{9}$$

Thereafter, when the valve T is opened more, a flow velocity v2 within the pipe increases according to a law of continuity, and this means increase of $\Delta P$ and $P_n$ [Equations 4 and 8]. As $P_n$ increases, $P_n > P_b + P_0$ and thus equilibrium breaks, the valve B receives a force upward and moves, and thus a sectional area of the discharge port increases. Thereby, a discharge flow velocity v, $\Delta P$, and $P_n$ decrease simultaneous, and at a new equilibrium position of $P_n = P_b + P_0$, the valve B stops. At a new equilibrium position, Equation 9 is again achieved and thus a fluid discharge speed at the discharge port maintains a constant value regardless of an opening rate of the valve T. However, because a sectional area of the discharge port changes according to an opening rate of the valve T, a discharge flux per unit time changes.

A frictional force $F_s$ generated at a contact surface of the valve B and the pipe generates an unexpected difference of a discharge flow velocity calculated by Equation 9. When the difference is not small enough to ignore, it is necessary to reduce a frictional force. In general, a frictional force may be considerably reduced by surface processing technology of a contact surface. Furthermore, for decrease of a frictional force, when a micro gap is maintained between the valve B and the pipe, water leakage may occur and an influence thereof will be described later (the same in the valve C, the valve D, and the valve E)

Movement of the valve B will be described by a drag. When a micro gap is maintained to minimize a change of a discharge flow velocity v by a frictional force of the valve B and the pipe, a fluid is leaked upward through the gap and the valve B receives a drag $D_b$ by a fluid. When $F_b$ ($F_b$ is constant, will be described later), which is the sum of the gravity and a buoyant force of the valve B operates downward, and when a magnitude thereof is the same as a drag, an equilibrium state of a force is obtained and thus the valve B will not move. In this state, as an opening rate of the valve T changes, when a flow velocity changes, a drag changes and thus the valve B moves to an upper direction or to a lower direction. As the valve B moves, a sectional area and a discharge flow velocity v of the discharge port change, and a drag $D_b$ changes, and thus at a new equilibrium position, which is $D_b = F_b$, the valve B will stop. Finally, a discharge flow velocity has a constant value of Equation 10. Equations 9 and 10 are different in an expression method of the right side and have the same value in a discharge fluid speed.

$$D_b = 0.5 \rho C_d A v^2$$

$$F_b = D_b$$

$$F_b = 0.5 \rho C_d A v^2$$

$$v = \sqrt{(2F_b)/(\rho C_d A)} \tag{10}$$

In the foregoing description, an operation principle has been described under the assumption that upper space of the valve B maintains an atmospheric pressure, and this will be described hereinafter.

As the valve B and the pipe close contact, there is no water leakage (cross-sectional view of FIG. 6), and upper space of the valve B maintains an atmospheric pressure through a gap between an intermediate portion 21b or an upper portion of the valve B and an upper portion of the discharge port.

In order to decrease a frictional force, when a micro gap is maintained between the valve B and the pipe, water leakage occurs and an influence thereof will be described hereinafter (FIGS. 7 and 8).

First, when a sectional area of the valve B of the bottom and the top is the same, water leakage in which a water level raises with a flow velocity v along a side surface of the valve B forms an open-channel flow $v_o$ at discharge port side space of the valve B and is discharged to the outside. In this case, when a discharge water amount by an open-channel flow does not reach a water leakage amount that raises a water level, the valve B may be sunk. This discharge water amount in every second increases as a water level increases. After the valve B is sunk, a rising speed of the water surface decreases (v') (law of continuity), and as an open-channel flow $v_o$ discharge water amount increases, at a point at which a water leakage amount and the open-channel flow discharge water amount are the same, increase of the water surface will stop (in the drawing, an arrow length has no special meaning). In this case, when a maximum water level at the discharge port is maintained lower than an upper portion of the discharge port, upper space will maintain an atmospheric pressure.

Second, when a cross-sectional area of an intermediate portion and a cross-sectional area of an upper portion of the valve B is smaller than a cross-sectional area of a lower portion thereof, a water level rising speed v" of a side surface of the valve B is smaller than a discharge flow velocity v and at a predetermined water level in which the valve B is not sink, the water surface may stop from rising. In a maximum water level state, when a water level of the discharge port side is maintained lower than a highest portion of the discharge port, upper space of the valve B may maintain an atmospheric pressure. A highest water level may be changed according to a lower portion 21a and an intermediate portion 21b of the valve B, the inside of the pipe 2, a sectional area difference among the lower portion 21a and an intermediate portion 21b of the valve B, the inside of the pipe 2, and a size of the discharge port.

In this way, when equilibrium is formed at a predetermined water level, a volume of the valve B submerged in the fluid is constant and thus a buoyant force of the valve B is also constant, and $F_b$, which is the sum of the gravity and a buoyant force of the valve B is also constant.

In consideration of a frictional force, a flow velocity when the valve B moves downward (v−) and when the valve B moves upward (v+) is represented with Equations 11 and 12.

$$v- = \sqrt{K(F_b - F_s)} \tag{11}$$

$$v+ = \sqrt{K(F_b + F_s)} \tag{12}$$

In order to reduce a difference between v− and v+, it is necessary to reduce $F_s$ to a level to ignore, compared with $F_b$, and for this purpose, in addition to a method of forming a gap between the valve B and the pipe, there is a method of forming the valve B in a sphere, a roller, or a combined shape thereof. Further, deformation of the valve B that guides an open-channel flow channel to the center of the discharge port, deformation of the valve B that forms a lower portion in a curved surface in order to smooth a discharge streamline, and deformation that forms a discharge port in a net or several small holes in order to prevent a foreign substance from being injected into a pipe are illustrated in FIGS. 8, 9, and 18.

In general, in an area in which a water pressure is high, at an upper stream of the valve T, a decompression valve is additionally installed. Further, when a safety valve is added at the down stream side of the valve T, preparation may be made for an unexpected situation in which a flow velocity rapidly increases in the discharge port by a foreign substance.

The present invention may be applied to even a case where a discharged fluid is a gas. However, in order for a fluid rising to a side surface of the discharge port to perform an open-channel flow to space of the discharge port side, a discharged fluid should be heavier than an external fluid, and the present invention is applied only to such a case.

3) Use lift and gravity (FIGS. 10, 11, and 12)

A discharge port 2*a* is formed in a pipe connected to the down stream side of the valve T, and a discharge port valve C (22) (hereinafter, valve C) formed with a closure member 221 and a support 222 is installed at the inside of the pipe.

At a front surface of the closure member of the valve C, a pair of airfoils or two pair or more airfoils 221*c* positioned at the left and the right are formed. The airfoil may be formed by embossing or engraving a cambered airfoil or a symmetrical airfoil, and in the symmetrical airfoil, in order to generate a lift, an angle of attack is formed to exceed an angle of 0°. In a central portion of a front surface of the closure member of the valve C, a deep groove 221*a* is formed, and at a lower portion thereof, a shallow groove 221*b* is additionally formed. The valve C is fixed to the pipe by a pin 2*e* or a screw inserted through a hole 222*a* formed in the support into a penetration groove or a groove 2*d* within the pipe and is coupled to a shaft (rotation shaft) to freely rotate. Because a torque of the valve C is determined by a length of a moment arm and a mass, the torque may be changed by a method of individually or complexly adjusting a mass, a position of a rotation axis, and a position a mass center. For example, when installing a moving weight 222*b* in the support and changing a position thereof, the center of mass moves and thus a length of the moment arm changes, whereby the torque changes. A front surface of the valve C and the pipe may close contact to prevent water from leaking or may maintain a gap for decrease of a frictional force, and a vertical cross-sectional line of two opposing surfaces is disposed on a concentric circumference about a rotation axis of the valve C. At a periphery of the discharge port of the pipe, a shape 2*c* protruded into the pipe may be added (unevenness formed at an opposite surface of the valve C and the pipe is shown in FIG. 12).

When the valve T is opened, a fluid is discharged to the airfoil portion ③ and the discharge port ① (FIG. 11). In this case, the airfoil generates a lift L, and the valve C forms equilibrium and stops at a point in which a torque $r_2L$ by a lift, the torque T by a buoyant force and the gravity of the valve correspond (it is assumed that a frictional force is very small enough to ignore). When an opening rate of the valve T changes, at a discharge port, a change of a flow velocity, a change of a lift, movement of the valve C, a change of a flow velocity, a change of a lift are consecutively and sequentially occur and stop at a new equilibrium point. In this case, a flow velocity is represented by Equation 15, and has no direct relation to an opening rate of the valve T (i.e., a discharge flux per unit time).

$$L=(\tfrac{1}{2})\rho C_1 A v^2 \tag{13}$$

$$r_2L=T \tag{14}$$

$$v=\sqrt{2T/r_2\rho C_1 A} \tag{15}$$

When the valve C, an airfoil, and a rotation center are determined, at the right side of Equation 15, factors other than T become a constant. When the center of mass of the valve C moves within ±θ range from a horizontal line of the center of rotation and a mass of the valve C is m, a length from the center of rotation to the center of mass is $r_1$, a change width of T and v is represented with Equations 16 and 17 (because the lift L operates in a tangential direction at a concentric circle of the center of rotation, the lift L is unrelated to θ and a buoyant force is omitted for convenience). This means that when the valve C moves in a range of vertically 15°, a flow velocity has fluctuation of about 1.7%. An operation range of the valve C may be adjusted by a target value of a size and a shape of a valve and a discharge port, and a maximum discharge amount per unit time.

$$T=r_1 mg \cos \alpha (-\theta \le \alpha \le +\theta)$$

$$r_1 mg \cos \theta T \le r_1 mg \tag{16}$$

$$k\sqrt{\cos\theta} \le v \le k, (k=\sqrt{2r_1 mg/r_2\rho C_1 A}) \tag{17}$$

In FIG. 11, a fluid discharged in a direction ② (when a gap exists between the valve C and the pipe) and a direction ③ intends decrease of a frictional force between the valve C and the pipe and generation of a lift, naturally joins with a fluid discharged in a direction ①, and it is necessary to finally maintain at least a flow speed change and a smooth streamline. For this purpose, unevenness of the valve C and the discharge port may be formed, as shown in FIG. 12. A protruded portion 2*c* at a periphery of the discharge port functions a fluid discharged in directions ② and ③ not to be directly discharged to an upper portion of the discharge port. Even if the protruded portion 2*c* does not exist, when the discharge port is changed in a net form (FIG. 9), a similar effect may be obtained. The fluid v discharged in directions ② and ③ is slow down at a portion ④ (v', law of continuity) and joins with a portion ① in an open-channel flow form $v_o$ in a portion ⑤. In this case, when a flux of ② and ③ is much less than a discharge flux of ①, a flow velocity and a flow line of ① finally have no large change.

The present invention is applied when a discharged fluid is a liquid or a gas. However, the present invention is applied only when a discharge fluid is heavier than an external fluid.

4) Use Drag and a Restoring Force of an Elastic Body (FIGS. 13, 14, and 15)

At a pipe connected to the down stream side of the valve T, the discharge port 2*a* is formed, and at the inside of the pipe, a discharge port valve D (23) (hereinafter, a valve D) is installed. The valve D is formed with a closure member 231, a drag body 233, a support 232 for connecting them, and a spring 234, and the drag body is coupled to position at an upper stream further than the discharge port. As a device for easily adjusting a restoring force of the spring, a volt 236 and a nut 235 may be added to an end portion of one side of the spring. For reduction of a frictional force, when a gap exists between the valve D and the pipe, at a central portion of a front surface of the closure member of the valve D, a deep groove 231*a* is formed, at a low side thereof, a shallow groove 231*b* is formed, and at a periphery of the discharge port of the pipe, a shape 2*f* protruded to the inside of the pipe may be added. Unevenness of a portion contacting with the closure member of the valve D and a discharge port of the pipe is shown in FIG. 14 ($t_2 > t_1$). In this case, water leakage due to a micro gap is formed in an open-channel flow form, and a process of joining with a fluid discharged to the discharge port is the same as that in a portion, except for a water leakage portion of an airfoil portion in the valve C.

A drag acting on the valve D is unrelated to a flow velocity of the discharge port and is related to a flow velocity of the inside (portion at which the drag body is positioned) of the pipe at the upper stream side rather than the discharge port. When a restoring force of the spring is $F_x$ and a drag in which the valve D receives from a fluid is $D_d$, sizes thereof are represented with Equations 18 and 19.

$$F_x = k_1 x \ (k_1: \text{elastic modulus}) \tag{18}$$

$$D_d = k_2 v_2^2 \ (k_2 = 0.5 \rho C_d A) \tag{19}$$

When a drag and a restoring force of the spring are balanced, the valve D will not move, and in this case, a moving distance of the valve is proportional to $v_2^2$ [Equation 21].

$$F_x = D_d \tag{20}$$

$$x = k_3 v_2^2, \ (k_3 = k_2/k_1) \tag{21}$$

An opening sectional area S of the discharge port is a function of x and is represented with Equation 22. When S is assumed as Equation 23, Equation 21 is substituted thereto, and law of continuity is applied, a flow velocity of the discharge port is represented with Equation 25.

$$S = \int_0^x f(x) dx \tag{22}$$

$$S = k_4 \sqrt{x} \tag{23}$$

$$S = k_5 v_2, \ (k_5 = k_4 \sqrt{k_3}) \tag{24}$$

$$v = k_6, \ (k_6 = S_2/k_5, \ S_2: \text{pipe sectional area}) \tag{25}$$

f(x) satisfying Equations 22 and 23 has a form of Equation 26, and when a closure direction shape of the discharge port follows f(x) functional formula, a discharge flow velocity at the discharge port is constant.

$$f(x) = k/\sqrt{x} \tag{26}$$

When an initial position of the valve D and an initial opening sectional area of the discharge port are x' and S', respectively, $$S' = k \int_0^{x'} (1/\sqrt{x}) dx, \ f(x) = k/\sqrt{x} \tag{FIG. 15}$$

5) Use a Lift, a Drag, and a Restoring Force of an Elastic Body (FIGS. 16 and 17)

At a pipe connected to the down stream side of the valve T, a discharge port 2a is formed, and at the inside of the pipe, a discharge port valve E (24) (hereinafter, a valve E) is installed. The valve E is formed with a closure member 241, an airfoil 243, a support 242 for connecting them, and a spring 244, and the airfoil is coupled to position at an upper stream further than the discharge port. For reduction of a frictional force, when a gap is formed between the valve E and the pipe, a central portion of a front surface of the closure member of the valve E has a deep groove 241a, a shallow groove 241b is formed at a lower portion thereof, and a shape 2g protruded to the inside of the pipe is added at a periphery of the discharge port of the pipe. In this case, a discharge process of water leakage is the same as that of the foregoing description. When an airfoil is formed in a symmetrical form, in order to generate a lift, an angle of attack is formed to exceed 0°. When the support and the pipe, and the support and the airfoil are connected by a pin 2e or a screw, and the support and the airfoil are coupled to freely rotate using the pin as a central axis. As a spring, a torsion spring (M=Kδ) may be mounted about the pin that connects the support and the pipe, and a coil spring may be mounted at an appropriate point between the valve E and the pipe. When the torsion spring is used, by forming a torsion spring mounting groove at a fixing pin and rotating the pin, a function of adjusting a restoring force is added.

When a connection pin is used at two points (i.e., total 8 points at both symmetrical surfaces) at each of one surface of the airfoil and the pipe (FIG. 16), if 4 points at a surface of one side become a vertex of a parallelogram, an angle of attack of the airfoil is constant to be unrelated to an opening rate of the valve, and otherwise, as the valve opens, an angle of attack of the airfoil may increase or decrease.

When a connection pin is used at one point (i.e., total four points at both surfaces) at each of one surface of the airfoil and the pipe (FIG. 17), a torque of the airfoil itself by a mass and a buoyant force occurs using the connection pin of the airfoil as a rotation center, and in a state in which the moment is balanced, an angle formed by a chord line and a streamline becomes an initial angle of attack (+α). Because a size and the center of the mass and a buoyant force change according to an airfoil density, non-uniformity of a density, and a shape of the airfoil, the size and the center of the mass and a buoyant force is designed so that an initial angle of attack becomes +α using such a property. When a rotation center of the airfoil is the center of pressure (CP), even if a lift and a drag occur, a torque of the airfoil itself does not occur and thus an initial angle of attack is continuously maintained, but otherwise a lift and a drag generate a torque of the airfoil itself and thus rotate to balance with a torque by a mass and a buoyant force, whereby an angle of attack may increase or decrease. When a torque by a lift and a drag is excessively larger than a torque by a mass and a buoyant force, the airfoil may lose a function thereof. FIG. 17 illustrates an example in which a rotation center is formed in a straight line at the center of mass (CM) and the center of a buoyant force (CB) while corresponding to the CP, but it is unnecessary to always dispose these three points in a straight line. As the CM and the CB are far separated in an opposite direction at a rotation center, a posture of the airfoil may be stabilized, and for this purpose, an additional shape may be added at both ends or other appropriate points of the airfoil.

In an equilibrium state, when an opening rate of the valve T changes, a change of a flow velocity of the pipe, a change of a lift and a drag of the airfoil, movement of the valve E, a change of a restoring force of the spring, and maintenance of new equilibrium are the same as a principle described in the valve D. However, there is a difference in that a lift additionally operates. Further, when applying approximation equation explanation, computer simulation, and an experimental method to such a principle, a relationship between a rotation angle δ of the valve E and a pipe flow velocity $v_2$ may be known, and thus a shape of the discharge port may be determined to make a discharge flow velocity constant.

In the drawing, when the airfoil is formed in a spherical shape or a symmetrical shape having an angle of attack of 0°, the airfoil does not receive a lift and receives only a drag and thus it is an exemplary embodiment of the valve D, not the valve E. In this case, because a drag operates in a streamline direction, a rotation center of a support, a drag body, and a position of a closure member should be set in consideration of the drag operating in a streamline direction.

INDUSTRIAL APPLICABILITY

The present invention may be used as a waterwork faucet at a house and an office building, and in addition, even if a discharge flux per unit time changes, the present invention may be usefully used as a device for constantly maintaining a discharge speed of a fluid (e.g., water or oil).

The invention claimed is:
1. A fluid discharge device comprising:
a discharge port (2a) formed in a surface of a pipe;
a discharge port valve (21) mounted inside of the pipe to change an opening sectional area of the discharge port while moving along the pipe by drag by a fluid on the discharge port valve (21); and
a discharge port valve seat (2b) formed inside of the pipe;
wherein the discharge port valve (21) is arranged to maintain the discharged of the fluid through the discharge port (2a) at a predetermined speed.

* * * * *